(12) United States Patent
Owen et al.

(10) Patent No.: US 6,968,349 B2
(45) Date of Patent: Nov. 22, 2005

(54) APPARATUS AND METHOD FOR VALIDATING A DATABASE RECORD BEFORE APPLYING JOURNAL DATA

(75) Inventors: David Finian Owen, Rochester, MN (US); Gary Ross Ricard, Chatfield, MN (US); Larry William Youngren, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 10/147,574

(22) Filed: May 16, 2002

(65) Prior Publication Data

US 2003/0217031 A1   Nov. 20, 2003

(51) Int. Cl.[7] .......................................... G06F 17/30
(52) U.S. Cl. .................................................. 707/204
(58) Field of Search .................... 707/1–10, 100–104.1, 707/200–205; 713/1; 714/45; 709/228; 717/108, 717/172, 177

(56) References Cited

U.S. PATENT DOCUMENTS

| | | | | |
|---|---|---|---|---|
| 5,765,172 A | * | 6/1998 | Fox ............................ | 707/204 |
| 6,092,189 A | * | 7/2000 | Fisher et al. .................... | 713/1 |
| 6,247,149 B1 | * | 6/2001 | Falls et al. ..................... | 714/45 |
| 6,324,693 B1 | * | 11/2001 | Brodersen et al. ........... | 717/177 |
| 6,442,748 B1 | * | 8/2002 | Bowman-Amuah ......... | 717/108 |
| 6,640,249 B1 | * | 10/2003 | Bowman-Amuah ......... | 709/228 |
| 2003/0009753 A1 | * | 1/2003 | Brodersen et al. ........... | 717/172 |
| 2004/0249869 A1 | * | 12/2004 | Oksanen ..................... | 707/204 |

* cited by examiner

Primary Examiner—Diane Mizrahi
(74) Attorney, Agent, or Firm—Martin & Associates, LLC; Derek P. Martin

(57) ABSTRACT

An apparatus and method includes a database journal that records journal entries. Each journal entry includes a validation value that is computed from the data and metadata for the record before it is changed. In this manner, journal entries may be applied with confidence to a record in a database. This is especially useful when minimized data journal entries are used. If the validation value of the journal entry matches the validation value computed from the data and metadata of the record that the journal entry is to be applied to, then the record before applying the journal entry is identical to the record in the original database, and the journal data may be applied to the database record. If the validation value of the journal entry does not match the validation value computed from the data and metadata of the record that the journal entry is to be applied to, the record is not the same as in the original database when the journal entry was generated. As a result, an error message is generated to indicate that an error was encountered when applying the journal entry. In this manner, the apparatus and method of the preferred embodiments automatically validate a database record before applying journal data to the record.

37 Claims, 13 Drawing Sheets

Record 2, File B, Target System

| Field 1 | Field 2 | Field 3 | ... | Field N |
|---------|---------|---------|-----|---------|
| Peter   | Parker  | 999-8765 |   | Illinois |

1010

↓ Journal Applying Software Applies

Minimized Data Journal Entry

| Journal Entry Prefix | Rec. # | Field 3 changed | Field 3 |
|---|---|---|---|
|   | 2 |   | 555-9181 |

930

↓ Result

Record 2, File B, Target System

| Field 1 | Field 2 | Field 3 | ... | Field N |
|---------|---------|---------|-----|---------|
| Peter   | Parker  | 555-9181 |    | Illinois |

```
//================================================
//
// Method Name: Checksum
//
// Description: Given a string and length, calculate a 64 bit Checksum
//
//================================================ uint64 Checksum64::Checksum(
        char* text,              1410
        uint32 textLength)       1412

{
uint64 crc;       1420
uint64 cnt;       1422
uint64 temp1;     1424
uint64 temp2;     1426 cnt = textLength;          1432 if (!ChecksumInit) {                 1440
        ChecksumInit = 1;            1442
        Init_Checksum_Table();       1444
} while (cnt) {                        1450
        temp1 = crc >> 8;            1452
        temp2 = Checksum64Table[crc^(uint64*)text) & 0xff];    1454
        crc = temp1 ^ temp2;   1456
        ++text;                1458
        --cnt;                 1460
} return crc;    1470

```
#pragma IsHome(Checksum64)
int Checksum64::ChecksumInit = 0;  // Checksum 64 table is not
initialized yet //================================================================
//
// Method Name:  Init_Checksum_Table()
//
// Description:  Call this function only once to initialize the checksum
table
//
//================================================================ inline void Checksum64::Init_Checksum_Table()
{
    // SPARC uses a CRC-64 of 0xD800000000000000
    const uint64 Checksum64Polynomial = 0xD800000000000000;
    uint64 I;
    uint64 j;
    uint64 part;

for (i=0; i<=255; i++)
    {
        part = i;
        for (j=0; j<8; j++)
        {
            if (part & 1)
                part = (part >> 1) ^ Checksum64Polynomial;
            else
                part >>=1;
        }
        Checksum64Table[i] = part;
    }
}
```

FIG. 15

Record 2, File B, Target System

| Field 1 | Field 2 | Field 3 | ... | Field N |
|---------|---------|---------|-----|---------|
| Peter | Parker | 999-8765 | ... | Illinois |

1010

Journal Applying Software Checks
Validation Value of Old Record Against
Validation Value of Current Entry in File B

Minimized Data Journal Entry 1330

| Journal Entry Prefix | Rec. # | Field 3 changed | Field 3 | Validation Value for Old Record |
|---|---|---|---|---|
| | 2 | | 555-9181 | A12F9E31245EAB3C |

Result - Journal Entry Not Applied
Because Validation Values Don't Match

Record 2, File B, Target System

| Field 1 | Field 2 | Field 3 | ... | Field N |
|---------|---------|---------|-----|---------|
| Peter | Parker | 999-8765 | ... | Illinois |

APPARATUS AND METHOD FOR VALIDATING A DATABASE RECORD BEFORE APPLYING JOURNAL DATA

BACKGROUND OF THE INVENTION

1. Technical Field

This invention generally relates to computer systems, and more specifically relates to apparatus and methods for computer databases.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Database system typically include a database manager that assures the integrity of the database as changes to the database are made. The database manager typically records changes to a database in a journal. The journal allows changes to the database to be rolled back if needed. In addition, a journal may be used to replicate a database by applying the journaled changes to a remote database in the same order the journaled changes were made to the original database.

Most journals known in the art record all fields in a record before a change is made to the record, including fields in the record that do not change. Because recording data that has not changed takes valuable space and time in a database journal, a newer concept known as minimized data journaling was introduced. With a minimized data journal, only the changed fields of a record are recorded, which assumes that the fields in the record that are not represented in the journal did not change.

Because not all information is present in a minimized data journal entry, it is possible under some circumstances that applying the minimized data journal entry to a replicated database may result in problems. If an application changes a record in the database, and a minimized data journal entry is then applied to the changed record, the result may be a mix of old and new data, resulting in an invalid record. To date, minimized journal data has not been extensively used in the industry due to the potential for problems if the journal is not replayed in exactly the same order as the original database, or if changes are made to a database record prior to applying one or more minimized data journal entries to the record. As a result, most database users do not use minimized data journaling due to the potential problems that might arise under certain circumstances. Full journaling is most commonly used, requiring significantly more information to be stored in the journal. Without a way to automatically verify that a database record is in an expected state before applying a minimized data journal entry to the record, the computer industry will be left with the undesirable choice of making full journal entries, at a cost of greater storage requirements and greater required bandwidth for transmitting the journal entries to a remote location, or making minimized journal entries with the potential for problems discussed above. Neither of these choices is desirable.

DISCLOSURE OF INVENTION

According to the preferred embodiments, an apparatus and method includes a database journal that records journal entries. Each journal entry includes a validation value that is computed from the data and metadata for the record before it is changed. In this manner, journal entries may be applied with confidence to a record in a database. This is especially useful when minimized data journal entries are used. If the validation value of the journal entry matches the validation value computed from the data and metadata of the record that the journal entry is to be applied to, then the record before applying the journal entry is identical to the record in the original database, and the journal data may be applied to the database record. If the validation value of the journal entry does not match the validation value computed from the data and metadata of the record that the journal entry is to be applied to, the record is not the same as in the original database when the journal entry was generated. As a result, an error message is generated to indicate that an error was encountered when applying the journal entry. In this manner, the apparatus and method of the preferred embodiments automatically validate a database record before applying journal data to the record.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 10 is a block diagram showing a potential problem that could arise when applying a minimized data journal entry in accordance with the prior art;

FIG. 14 is sample pseudo-code that shows one suitable way to compute a 64-bit checksum value for a database record;

FIG. 15 is sample pseudo-code for initializing a table of coefficients used to compute a 64-bit checksum value for a database record; and FIG. 16 a block diagram that illustrates that the minimized journal entry that includes a validation value is not applied if the validation value in the journal entry does not match a validation value computed on the database record to be changed.

BEST MODE FOR CARRYING OUT THE INVENTION 1.0 Overview

The present invention relates to journaling changes in a database. For those not familiar with databases and journaling, this Overview section will provide background information that will help to understand the present invention.

Known Databases

Figure 2:
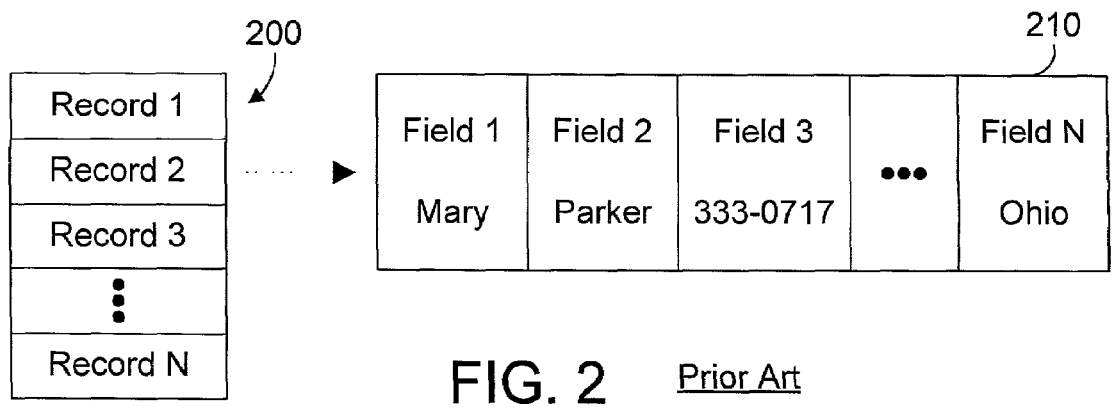
FIG. 2 is a block diagram showing a sample fixed length database record as known in the prior art.

There are many different types of databases known in the art. The most common is known as a relational database (RDB), which organizes data in tables that have rows that represent individual entries or records in the database, and columns (or fields) that define what is stored in each entry or record. Database records may be fixed length or may be variable length. One example of a fixed length record is shown in FIG. 2. A database table 200 includes several records. The second record 210 is shown in more detail, with its defined fields. Each of the fields of record 210 are defined to have a fixed length. The length of each field may be defined independently of the other fields, but each is a fixed length and the same length in every record of database table 200.

Figure 3:
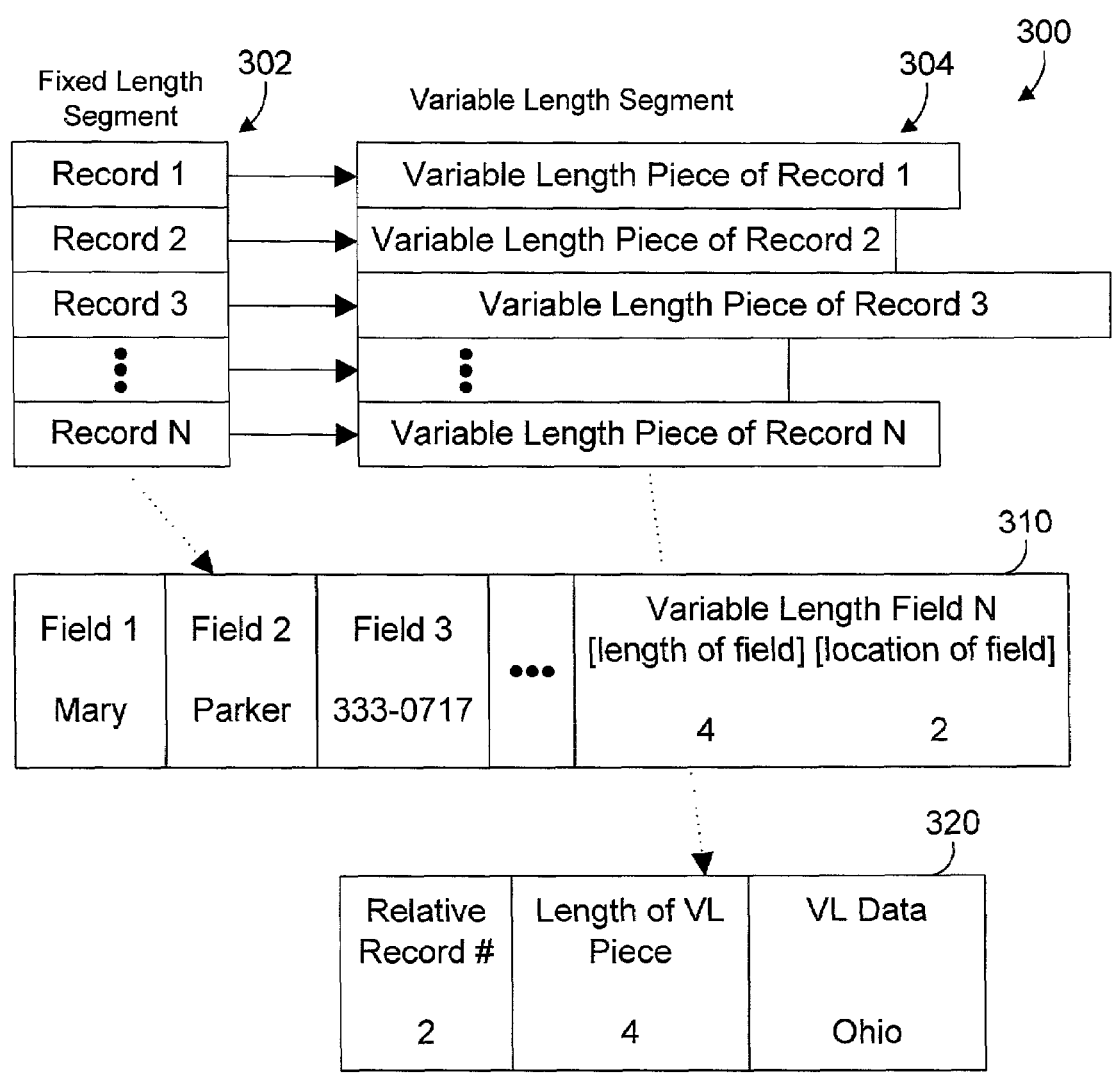
FIG. 3 is a block diagram showing a sample variable length database record as known in the prior art.

An example of a variable length record is shown in FIG. 3. A database table 300 is defined to contain variable length records. Each record is comprised of a fixed length segment 302 and a variable length segment 304. Assuming similar data as shown in FIG. 2, the fixed length segment 310 of the second record is shown to contain multiple fixed length fields. Note that the last field is a fixed length field that defines the location and size of the variable length segment. The variable length segment 320 includes a relative record number (2) and a length of the variable length data piece (4), which represents that Ohio has four letters.

Known Methods of Journaling Changes to a Database

Figure 4:
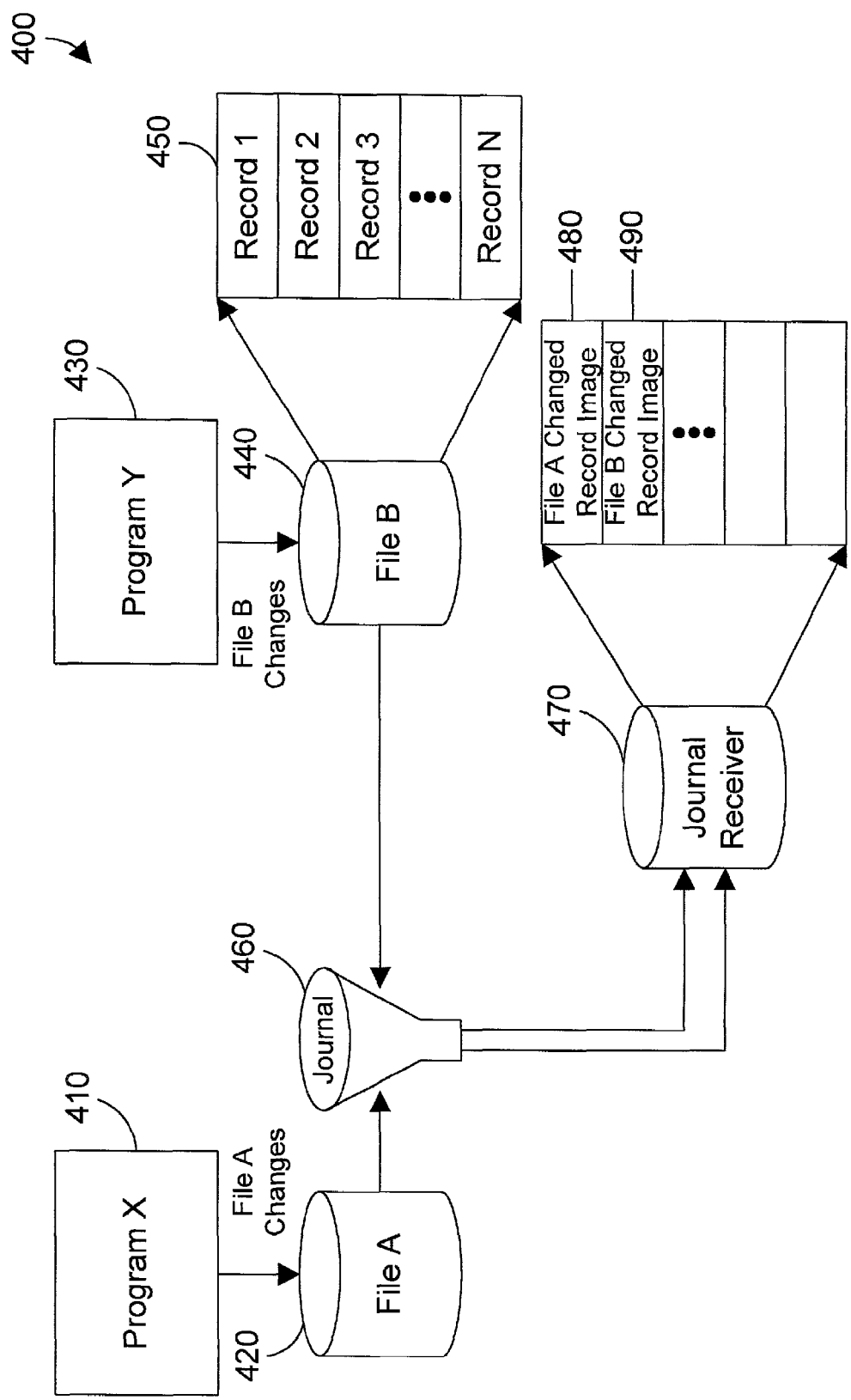
FIG. 4 is a block diagram showing how changes to different files may be logged to the same journal, as is known in the prior art.

An example of a known system for journaling changes to a database is shown in FIG. 4. Computer system 400 includes a program X (410) that changes File A (420), which is representative of a database file or table that contains records. A different program Y (430) changes File B (440).

Both File A 420 and File B 440 are made up of a table of records, as shown by way of example in the table 450 for File B 440.

Changes to File A 420 and to File B 440 are written to a journal 460. Journal 460 writes journal entries to the journal receiver 470. Note that the journal receiver 470 includes journal entries, such as entries 480 and 490 shown in FIG. 4. In the prior art, these journal entries may be full journal entries that list all of the fields of a record that is changed, or minimized data journal entries that list only the fields of a record that changed. Journal entry 480 contains the information about a changed record in File A 420, while journal entry 490 contains the information about a changed record in File B. With the system 400 shown in FIG. 4, either full journal entries or minimized data journal entries may be written to the journal receiver.

Figure 5:
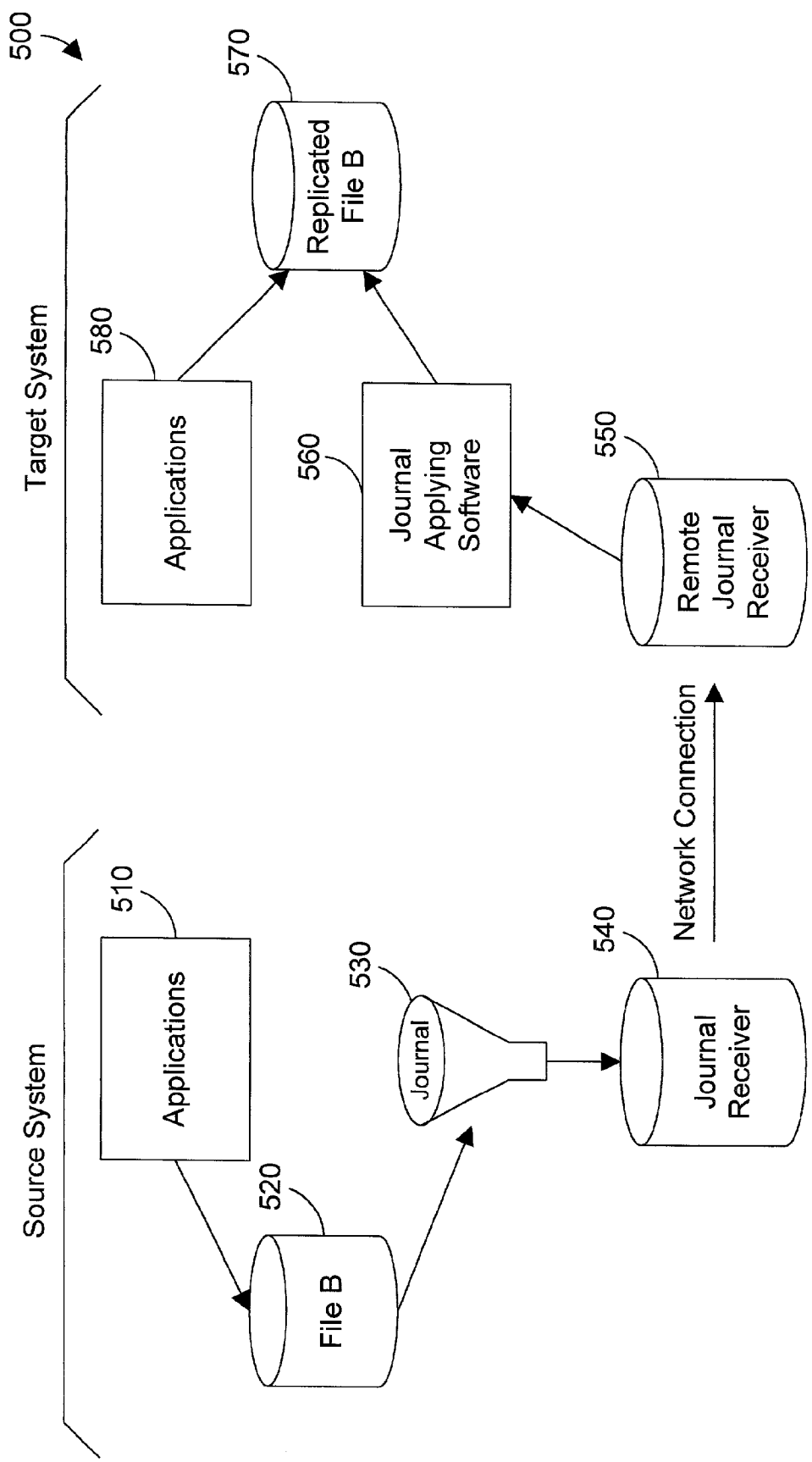
FIG. 5 is a block diagram of a prior art system that shows how a file may be remotely replicated on a target system using the journal information on the source system.

One way that journal entries may be used is to replicate a database in a first location ("source system") to a computer system at a second location ("target system"). An example of such a configuration is shown as system 500 in FIG. 5. We assume for this example that applications 510 access File B 520 and may make changes to File B 520. The changes are collected in journal 530, which writes the journal entries to the journal receiver 540. A remote journal receiver 550 in the target system is coupled via a network connection to the journal receiver 540 in the source system, and receives the journal entries written to the journal receiver 540. Journal applying software 560 retrieves the journal entries from the remote journal receiver 550, and applies the journal entries to the remotely replicated File B 570. Applications 580 may now access the data in the remotely replicated file B 570 as required. Note that applications 580 preferably only read the remotely replicated file B 570, and do not change it.

File B 520 can be initially copied from the source location to remotely replicated file B 570 in the target location. Once file B is present at both locations, changes to the file in the source location may be reflected in the database in the target location by transmitting the journal entries from the source location to the target location, and by applying the changes reflected in the transmitted journal entries to the database in the target location.

Figure 6:
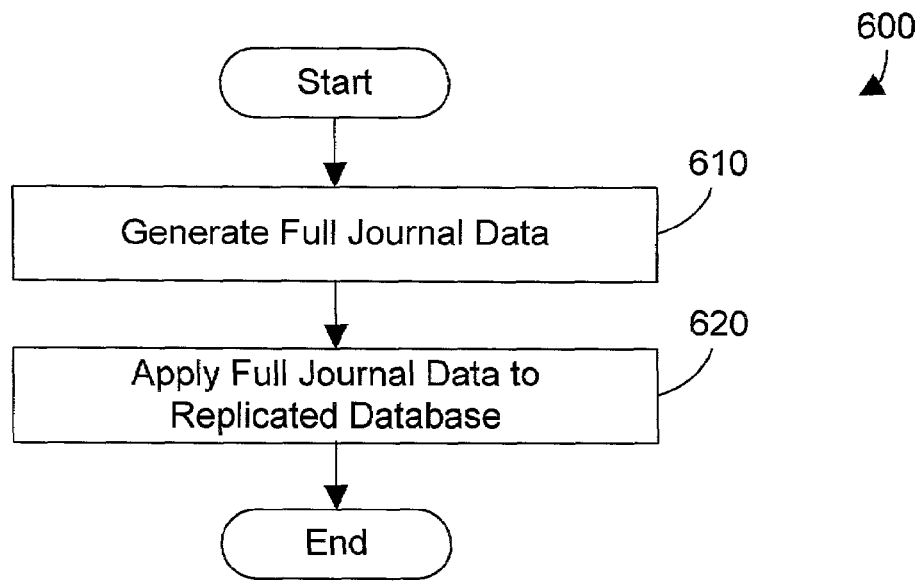
FIG. 6 is a flow diagram of a prior art method for generating and applying full journal data.
Figure 7:
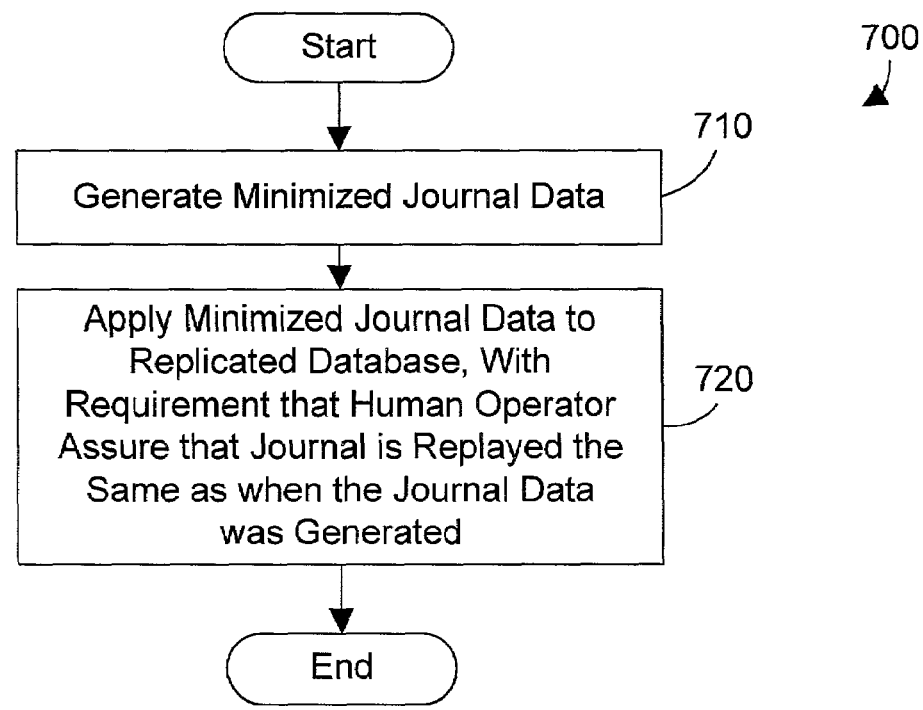
FIG. 7 is a flow diagram of a prior art method for generating and applying minimized journal data.
Figure 8:
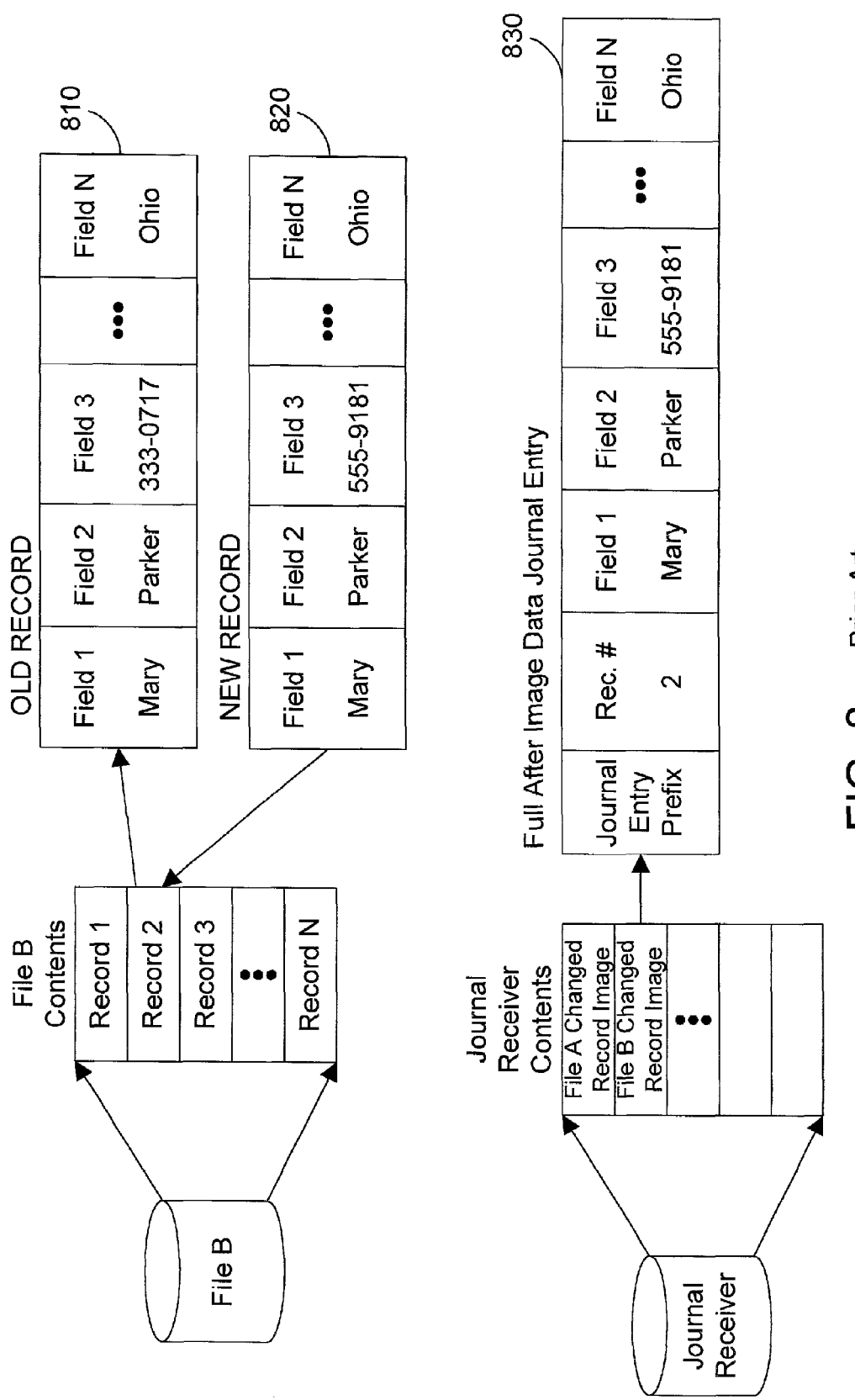
FIG. 8 is a block diagram showing how a change to a record is reflected in a full data journal entry in the prior art.

Two known ways of replicating a database are shown in FIGS. 6 and 7. Referring to FIG. 6, method 600 begins by generating full journal data for each journal entry (step 610). This full journal data is then sent to the replicated database at the target location, and applied to the replicated database (step 620). An example of full journal data is shown in FIG. 8. We assume for this example that old record 810 represents the record of interest, with the data as shown in FIG. 8. New record 820 shows that Mary Parker's phone number in Field 3 has been changed from 333-0717 to 555-9181. We assume that all other data in the record remains unchanged. A full data journal entry 830 is shown in FIG. 8 that reflects the change made to the phone number in the record by listing all fields and their values after the change was made. Collecting full data journal entries will assure that the target database will accurately reflect the current state of the source database, but requires journaling significant amounts of data that does not change, which takes a significant amount of time to transmit from the source location to the target location.

Referring back to FIG. 7, another prior art method 700 for replicating a database begins by generating minimized journal data (step 710). The minimized journal data is then applied to the replicated database, assuring that the journal is replayed the same as when it was generated (step 720). Using minimized journal data reduces the storage requirements for journal data because only the data that is changed is written to the journal. As a result, there is considerably less journal data to transmit to the target system. However, the use of minimized journal data in the prior art has been a case of "user beware", meaning that the system administrator of the target system would have to assure that the journal is replayed properly, in the correct order, and is not corrupted by applications running on the target system. Because of this potential for error, many critical database applications do not use minimized journal data, but force full journal data to be collected to assure the integrity of the database.

Figure 9:
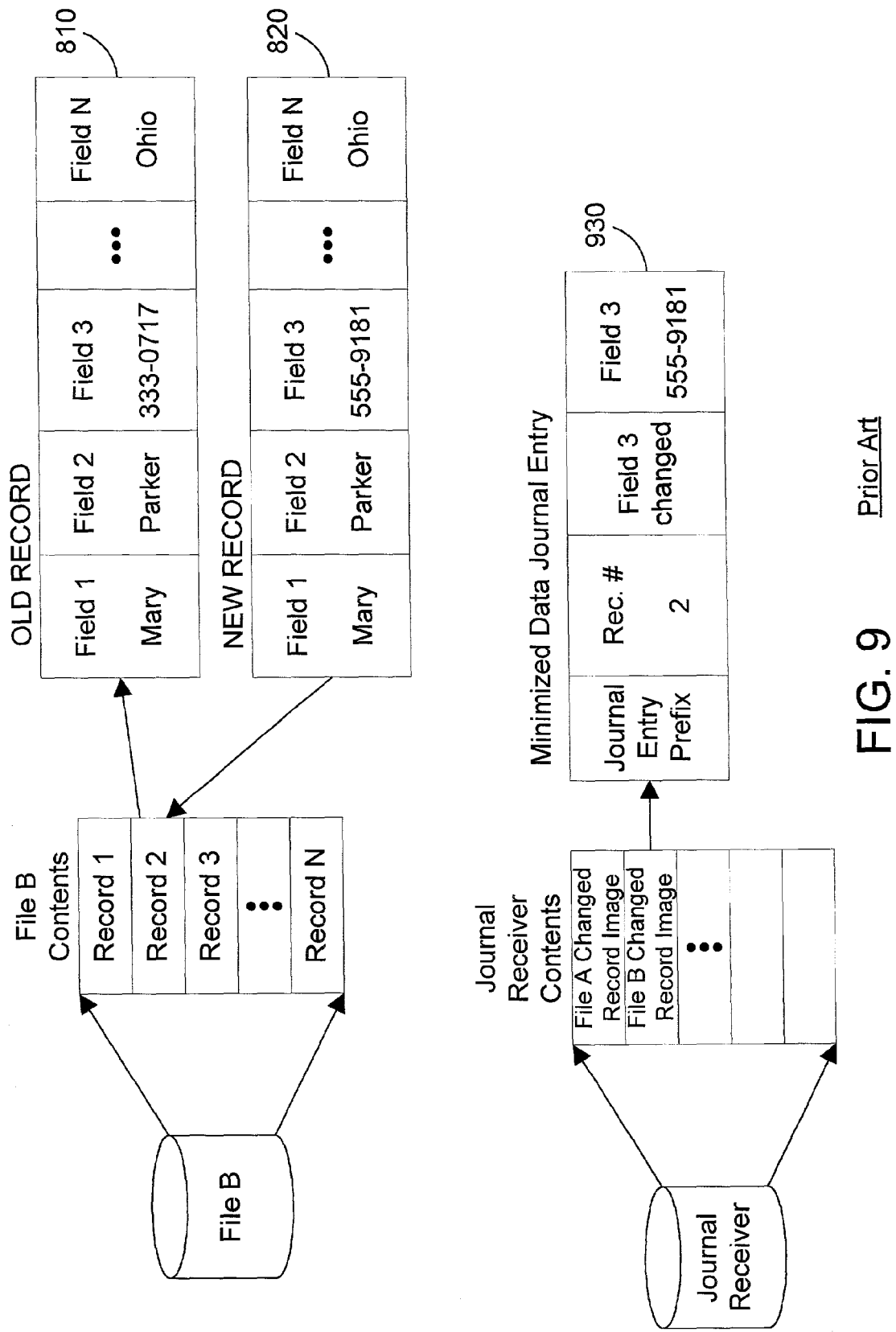
FIG. 9 is a block diagram showing how a change to a record is reflected in a minimized data journal entry in the prior art.

An example of minimized journal data is shown in FIG. 9. The old record 810 and new record 820 are identical to those shown in FIG. 8. The difference is that the change is written to the journal receiver as a minimized data journal entry 930. Note that journal entry 930 contains only the changed data. A prefix identifies the journal entry, and identifies who made the change resulting in the journal entry, and when the change was made. The record number correlates the journal entry to the record that the change applies to, namely, record number two. The next field contains a list of all fields in record 2 that were changed. The remaining field(s) list the values for each changed field. Because only field 3 changed in the example in FIG. 3, it is the only field listed, and its value is included in the minimized data journal entry. For tables or files with many fields, the space savings of recording minimized data journal entries is significant. However, due to potential problems relating to data integrity, the computer industry has been hesitant to used minimized data journal entries.

The problem with using minimized data journal entries can be shown graphically by the example in FIG. 10. We assume that file B on the source system is successfully copied to the target system. Now we assume that something happens that is not supposed to happen: record 2 in File B is replaced with different data. This could happen, for example, if an application 580 in FIG. 5 were to change the remotely replicated file B 570. We see that the new data in record 2 (1010) is for Peter Parker who has a phone number of 999-8765 and lives in Illinois. If the journal applying software 560 now applies the minimized data journal entry 930, the result is a record 1020 that is a hybrid of new data and old data. And the worst part is that the phone number in field 3, namely Mary Parker's new phone number 555-9181 in Ohio, appears to be a valid phone number for Peter Parker in Illinois. In other words, data may be corrupted in a way that is very difficult to detect. The same type of problem shown in FIG. 10 can also arise from processing journal entries out of order, or by starting the processing at an incorrect place.

If a full data journal entry were used in the example of FIG. 10, the system would detect that the record now has data for Peter Parker instead of Mary Parker, and could generate an error message notifying the system administrator of the problem, or could return an error to the source system. Due to the potential for problems, as shown in the example of FIG. 10, the computer industry has not implemented minimized data journaling on a wide scale. Most companies mandate that full data journaling be used to avoid the potential problems with using minimized data journal entries. The preferred embodiments address this problem by providing a way to validate a database record before applying a journal entry to the record, as discussed in detail below.

2.0 Detailed Description

The preferred embodiments provide a way to validate a database record before applying a journal entry to the database record. Before the change reflected in the journal entry is made to the database record, a validation value is computed that reflects the state of the database record before the change. This value is stored as part of the minimized data journal entry. When the journal is replayed, a validation value is similarly computed for the record whose fields are about to be changed based on minimized contents of the corresponding journal entry. The computed validation value is compared with the validation value stored in the journal entry. If the two match, the journal entry is applied to the database. If not, an error message is generated to notify the system administrator that the database was not in the state that was expected when replay of the journal entry was attempted.

Figure 1:
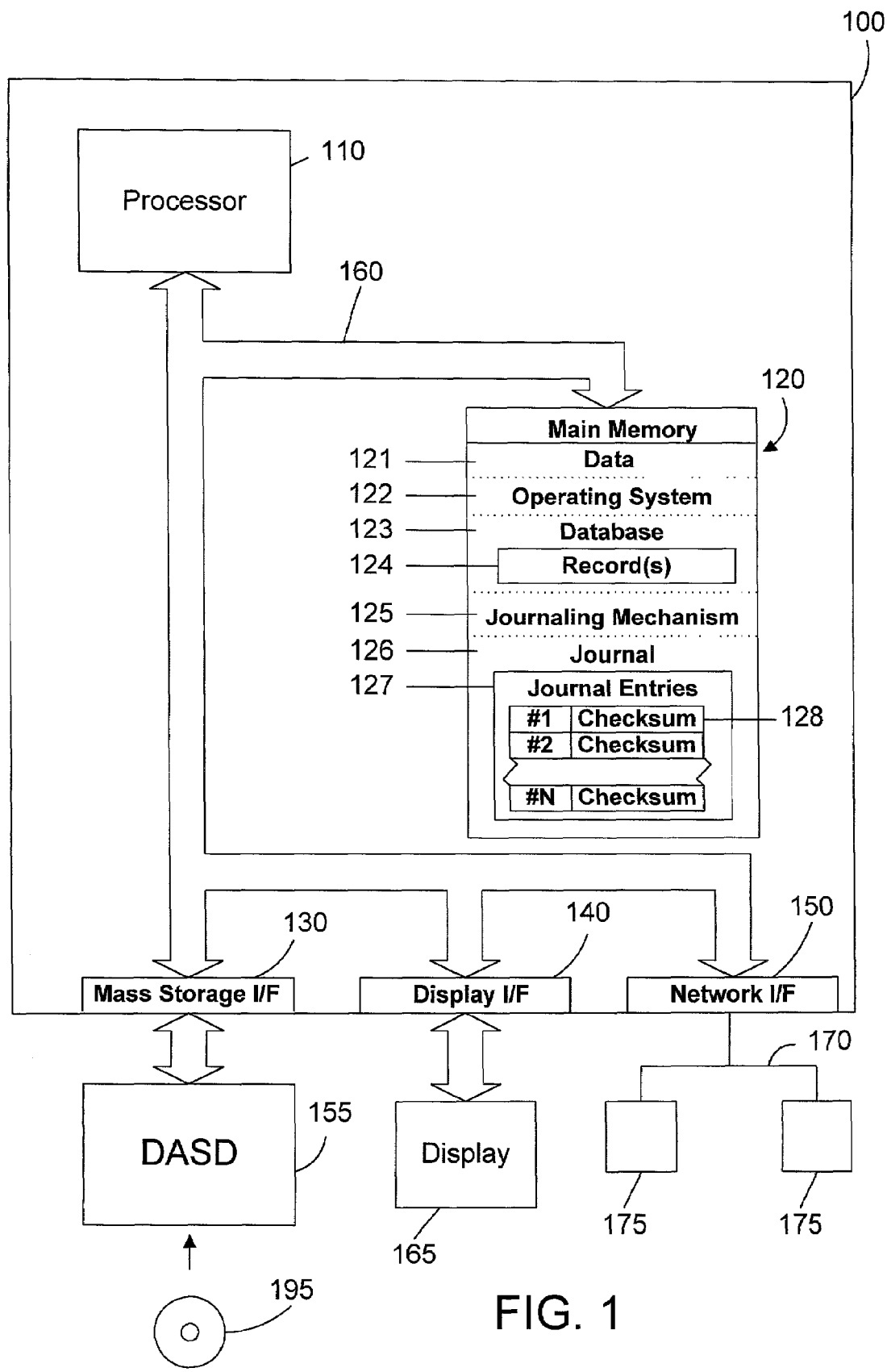
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD ROM drive, which may store data to and read data from a CD ROM 195.

Main memory 120 in accordance with the preferred embodiments contains data 121, an operating system 122, a database 123, a journaling mechanism 125, and a journal 126. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 comprises one or more records 124 that contain fields of data. Journaling mechanism 125 suitably generates journal entries 127 in the journal 126. Each journal entry 127 includes a checksum 128. Checksum 128 is one suitable implementation of a validation value that may be computed on a record 124 before the change reflected in the journal entry is applied to the record 124. Checksum 128 thus reflects the state of the record 124 before the change is made. This checksum 128 can then be used to validate the state of the record before applying the journal entry to the record. If the checksum 128 in the journal entry does not match a checksum computed for the record before applying the change, this means that the record is not in the expected state when the change is attempted. As a result, an error message is generated to indicate that the record is not in the expected state, and that the application of the journal entry failed.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, journaling mechanism 125, and journal 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD ROM (e.g., 195 of FIG. 1), and transmission type media such as digital and analog communications links.

Figure 11:
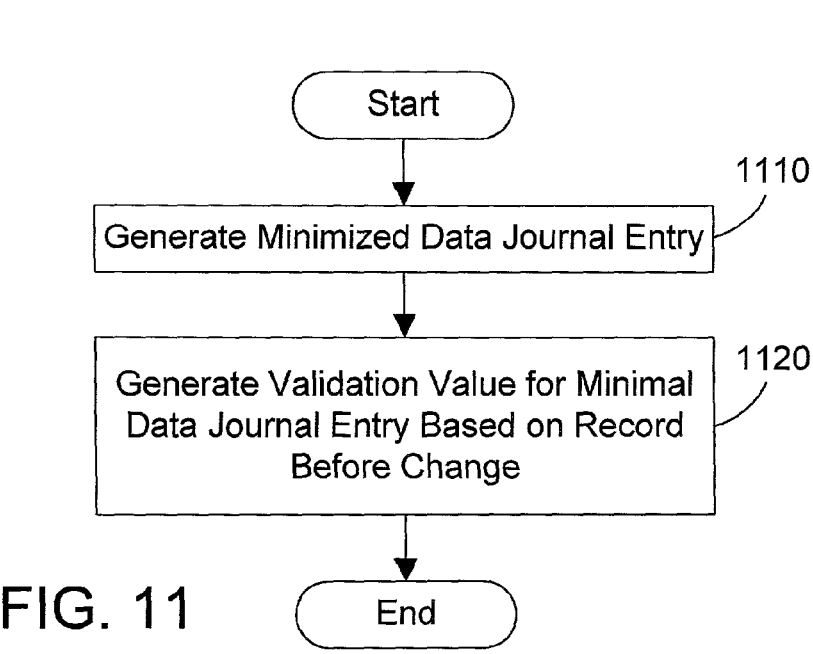
FIG. 11 is a flow diagram of a method for generating a validation value for a minimized data journal entry in accordance with the preferred embodiments.

Referring now to FIG. 11, a method 1100 in accordance with the preferred embodiments shows how a journal entry may include a validation value that can be used to assure the database record is in the expected state before applying the change reflected in the journal entry. First, a minimized data journal entry is generated (step 1110). A validation value is then generated that reflects the state of the record before the change is applied (step 1120). This validation value is stored with the journal entry that reflects the change.

Figure 12:
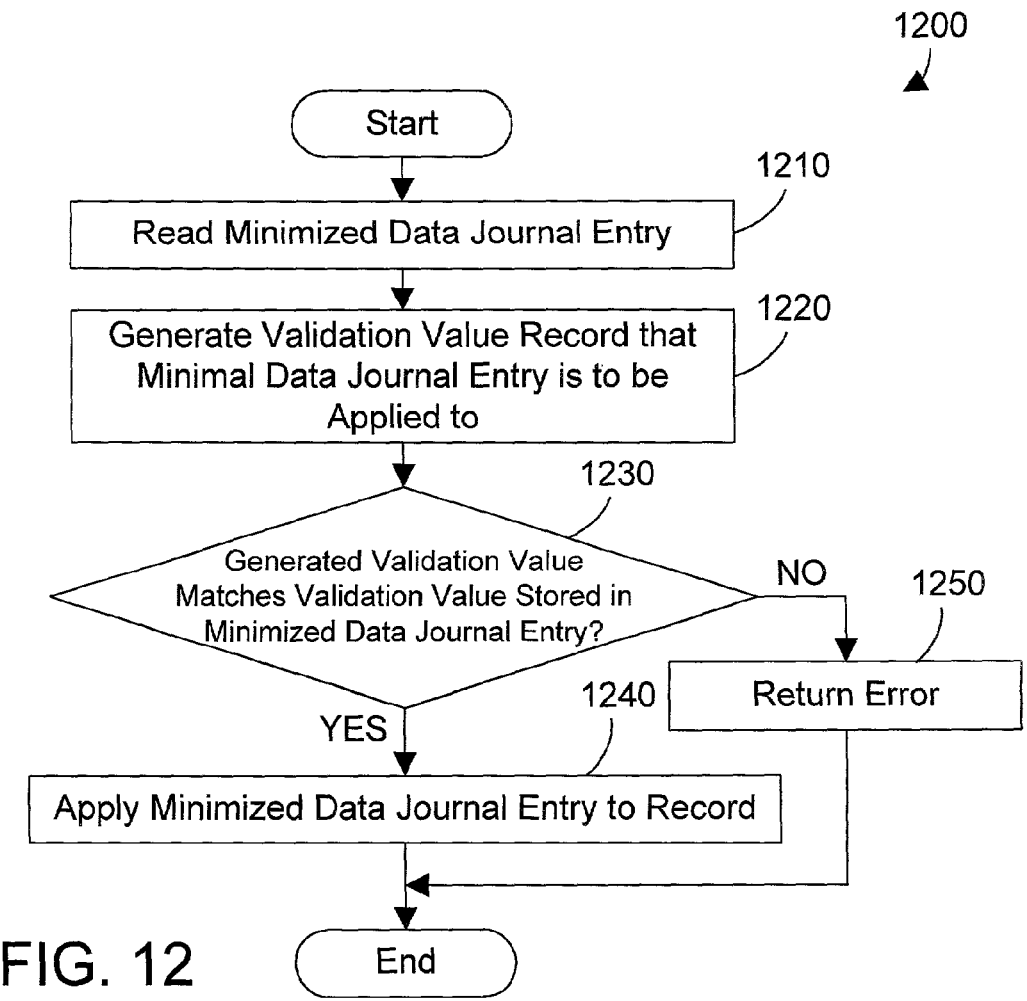
FIG. 12 is a flow diagram of a method for applying a minimized data journal entry to a database in accordance with the preferred embodiments.

FIG. 12 shows a method 1200 for applying minimized journal data that includes a validation value in accordance with the preferred embodiments. First, the minimized data journal entry is read (step 1210). The record the journal entry is to be applied to is identified from the read data. A validation value is then generated from the record that the journal entry is to be applied to (i.e., the record corresponding to the journal entry) (step 1220). The generated validation value is then compared against the validation value stored in the minimized data journal entry (step 1230). If these two validation values match (step 1230=YES), the minimized data journal entry is applied to the record (step 1240). If these two validation values do not match (step 1230=NO), an error is returned (step 1250). In this manner, method 1200 validates that a database record is in the expected state before applying a minimized data journal entry to the record.

Figure 13:
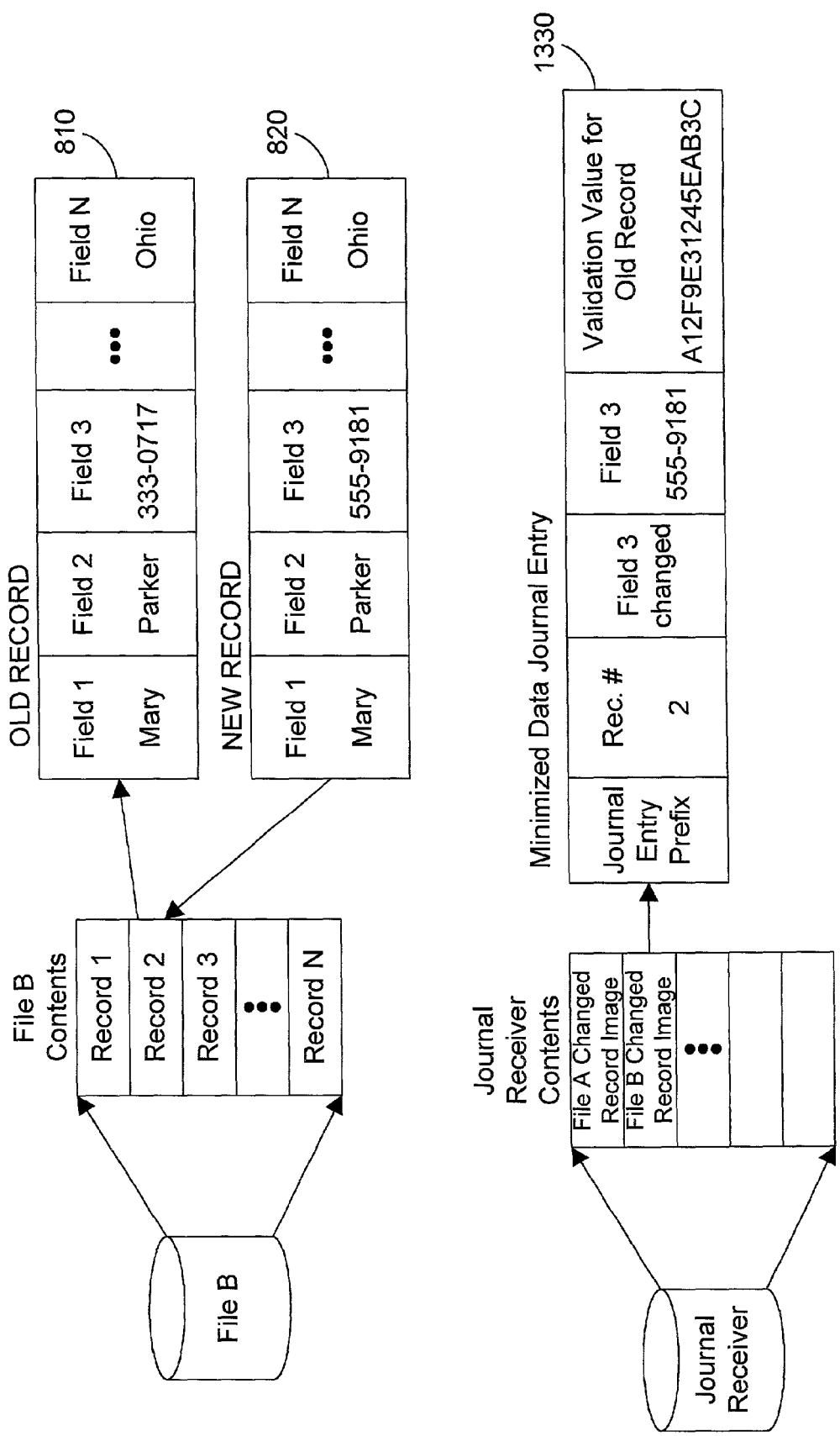
FIG. 13 is a block diagram that illustrates a minimized data journal entry that includes a validation value for the old record in the database (before applying the changes in the minimized journal entry) in accordance with the preferred embodiments.

An example of method 1100 is shown in FIG. 13. Old record 810 and new record 820 are identical to these same records shown in FIGS. 8 and 9. The difference lies in the minimized data journal entry 1330. In addition to the fields shown in the minimized data journal entry 930 of FIG. 9, minimized data journal entry 1330 additionally includes a validation value for the old record. We assume for this example that the validation value is a 64 bit checksum that is computed from the data in the old record and from the metadata for the old record. The computed validation value for this example is A12F9E31245EAB3C in hexadecimal format, which is a unique value that corresponds to the state of the old record 810 before the change was made.

Note that the algorithm used to generate the validation value in step 1120 of method 1100 in FIG. 11 must be the same as the algorithm used to generate the validation value in step 1230 of method 1200 in FIG. 12. This assures that the validation values will match when the database record is in the expected state just before applying the change represented by the journal entry. In the preferred embodiments, the validation value comprises a checksum that is computed using both the data in the old record and the metadata for the old record. Another type of suitable validation value is a cyclic redundancy check (CRC) that provides a unique value that indicates the state of the record before applying the change. The preferred embodiments expressly extends to any and all variations of validation values that can be computed or generated that uniquely represent the state of the record just before applying the change reflected in the journal entry.

While using checksums and CRCs is known in the art of data transmission, these are typically used to assure that data is successfully transmitted. For example, if data needs to be transmitted to a remote location, a checksum for the data may be computed and appended to the data. When the data is received, the same checksum algorithm is used to compute a checksum for the received data. The computed checksum is then compared with the checksum in the received data. If they match, the data was successfully transmitted. Note, however, that the preferred embodiments differ considerably from this prior art use of checksums. The validation value of the preferred embodiments is a value that relates to the state of the record that corresponds to the journal entry just before applying the changes reflected in the journal entry. The validation value of the preferred embodiments is not computed from values in the journal entry, but is instead computed from data and metadata for the record before the change in the journal was applied. In this sense, the use of validation values in the preferred embodiments is a considerable advance in the art. By adding a validation value to a minimized data journal entry, the state of the corresponding record may be easily verified before applying the changes reflected in the minimized data journal entry.

One sample method for computing a 64 bit checksum for a record in accordance with the preferred embodiments is shown in FIGS. 14 and 15. The method name is Checksum( ), as shown in FIG. 14. Two parameters text and textLength are passed when the Checksum( ) method is invoked, as shown in lines 1410 and 1412. The text parameter is a character string, while the textLength parameter is an unsigned 32 bit integer that represents the length of the character string. Note that the text parameter passed in represents both the data in the record and the metadata for the record. In this manner, a change to a record's metadata may be detected as easily as changes to the data itself. Variables crc, cnt, temp1 and temp2 are defined in lines 1420, 1422, 1424, and 1426, respectively. The variable cnt is assigned a value of textLength in line 1432.

Line 1440 is an "if" clause that is performed so long as ChecksumInit is false. In the initialization code in FIG. 15, we see that ChecksumInit is initialized to false. ChecksumInit is then set to a value of one, representing true (step 1442), and a routine Init_Checksum_Table( ) is invoked (step 1444). As shown in FIG. 15, the Init_Checksum_Table( ) method initializes the table of polynomial coefficients used to compute the 64-bit checksum. As the code at lines 1440–1444 of FIG. 14 illustrates, the checksum table will only be initialized the first time the Checksum( ) method is invoked.

Line 1450 is the beginning of a "while" loop that executes so long as variable cnt is greater than zero. Remember that cnt was initialized to the textLength that was passed as a parameter to the Checksum( ) method call. Line 1452 shifts the crc value right eight bits and stores the result in variable temp1. Line 1454 performs an exclusive OR between the crc and the current eight bytes of text and extracts the last byte into variable temp2. This last byte is the array index for checksum 64 table which selects the polynomial coefficient from the table. Line 1456 performs an exclusive OR function between the crc and the polynomial coefficient. Line 1458 increments the pointer to point to the next eight bytes of text. Line 1460 decrements the count of bytes to process. Upon exiting the while loop, the value of the crc variable is returned as the checksum in line 1470.

We now examine the example in FIG. 16 to illustrate how the preferred embodiments succeed in overcoming the problem of using minimized data journal entries in the prior art illustrated in FIG. 10. We assume again that record 2 has been overwritten with new data, as shown in record 1010 of FIG. 16 (which is identical to record 1010 in FIG. 10). The journal applying software reads a journal entry, determines that it should be applied to record 2 (1010), and computes a validation value for record 1010 before applying the changes in the journal entry. Because the values in the fields of record 2 are different than the values that were used to compute the stored validation value stored in the journal entry 1330, the computed validation value will not match the stored validation value in the journal entry. As a result, the journal applying software knows not to apply the journal entry because the record is not in the expected state, so record 1010 remains unaffected. When the validation values do not match, an error message is also sent to the system administrator so he or she can determine the cause of the problem. In our example, an application changed record 2. The error message will allow the system administrator to determine which application changed the record, and take appropriate corrective action.

The preferred embodiments disclose a way to use minimized data journal entries without the problems that are present in the prior art. A validation value is computed that uniquely represents the state of a record before changes are made to the record. This validation value is then stored as part of the minimized data journal entry that reflects the changes that were made to the record. When the minimized data journal entry is to be applied to the corresponding database record, a validation value for the record is first computed using the same algorithm used to compute the validation value stored in the journal entry. If the two validation values match, we know with a high level of confidence that the record is in the identical state it was in just before the changes reflected in the journal entry were made. By validating a database record before applying a change in a journal entry, the preferred embodiments solves the potential problems in the prior art and provides a low-cost solution that greatly enhances system performance by drastically reducing the amount of journal data that needs to be recorded and transmitted to a target system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the apparatus and methods disclosed herein are discussed in terms of minimized data journal entries, the computing of a validation value to validate a database record before applying a journal entry may also be done with full journal entries. The validation value may provide enhanced performance to easily determine whether the database record is in the expected state when compared to the process of scanning all values in the record to assure they match all of the values in the full journal entry. In addition, while the preferred embodiments embed the validation value in a field in the minimized data portion of a minimized data journal entry, the validation value could also be embedded into the prefix of the journal entry as well. Furthermore, while the minimized data journal entries discussed herein include changes made at the field level, the preferred embodiments expressly extend to a byte-level implementation that records in a minimized journal entry the bytes in a file or table that have changed.

What is claimed is:

1. A computer apparatus comprising:
   (A) at least one processor;
   (B) a memory coupled to the at least one processor;
   (C) a database journal residing in the memory, the database journal including a journal entry for a selected record in a database, wherein the journal entry includes:
      (C1) an indication of a change to at least one portion of the selected record; and
      (C2) a validation value that represents a state of the selected record in the database before making the change to the selected record and wherein the validation value comprises a checksum.

2. The apparatus of claim 1 wherein the indication of change lists less than all the selected record.

3. The apparatus of claim 1 wherein the validation value is computed from data in the selected record.

4. The apparatus of claim 3 wherein the validation value is further computed from metadata for the selected record.

5. The apparatus of claim 1 wherein the validation value is unique for data values stored in the selected record.

6. A computer apparatus comprising:
   (A) at least one processor;
   (B) a memory coupled to the at least one processor;
   (C) a database residing in the memory; and
   (D) a database journal residing in the memory, wherein the database journal includes a journal entry for a selected record in a database, wherein the journal entry includes:
      (D1) an indication of a change to at least one portion of the selected record; and
      (D2) a checksum that represents a state of the selected record in the database before making the change to the at least one portion, the checksum being computed from data in the selected record before making the change and from metadata for the selected record.

7. A computer-implemented method for journaling changes in a database comprising the steps of:
   (1) determining when a change to a selected record in the database needs to be made;
   (2) before making the change to the selected record, computing a validation value that represents a state of the selected record in the database; and
   (3) storing the validation value in a journal entry that indicates the change to the selected record.

8. The method of claim 7 further comprising the step of making the change to the selected record.

9. The method of claim 7 wherein the journal entry includes an indication of change that lists less than all the selected record.

10. The method of claim 7 wherein the validation value comprises a checksum.

11. The method of claim 7 wherein step (2) computes the validation value from data in the selected record.

12. The method of claim 11 wherein step (2) further computes the validation value from metadata for the selected record.

13. The method of claim 7 wherein the validation value is unique for data values stored in the selected record.

14. A computer-implemented method for replicating a first database in a source location to a second database in a target location, the method comprising the steps of:
   (1) at the source location, performing the steps of:
      (1A) determining when a change to a selected record in the first database needs to be made;
      (1B) before making the change to the selected record, generating a journal entry for the selected record that includes:
         (1B1) an indication of a change to at least one portion of the selected record; and
         (1B2) a validation value that represents a state of the selected record in the first database before making the change to the at least one portion;
   (2) transmitting the journal entry to the target location;
   (3) at the target location, performing the steps of:
      (3A) computing a validation value for a record in the second database that corresponds to the selected record in the first database;
      (3B) comparing the validation value for the corresponding record in the second database to the validation value in the transmitted journal entry; and
      (3C) if the validation values in step (3B) match, applying the transmitted journal entry to the second database.

15. The method of claim 14 further comprising the step of:
   (3D) if the validation values in step (3B) do not match, providing an error message.

16. The method of claim 14 wherein the journal entry includes an indication of change that lists less than all the selected record.

17. The method of claim 14 wherein the validation value comprises a checksum.

18. The method of claim 14 wherein step (2) computes the validation value from data in the selected record.

19. The method of claim 18 wherein step (2) further computes the validation value from metadata for the selected record.

20. The method of claim 14 wherein the validation value is unique for data values stored in the selected record.

21. A computer-implemented method for applying a journal entry to a corresponding record in a database, the method comprising the steps of:
   (1) reading a validation value stored in the journal entry, wherein the validation value represents a state of the corresponding record in the database before making the change to at least one portion of the record;
   (2) computing a validation value for the corresponding record in the database;
   (3) comparing the validation value for the corresponding record in the database to the validation value stored in the journal entry; and
   (4) if the validation values in step (3) match, applying the journal entry to the database.

22. The method of claim 21 further comprising the step of:
   (5) if the validation values in step (3) do not match, providing an error message.

23. The method of claim 21 wherein the validation value comprises a checksum.

24. The method of claim 21 wherein the validation value is computed from data in the selected record.

25. The method of claim 24 wherein the validation value is further computed from metadata for the selected record.

26. A program product on a tangible computer-readable storage, media comprising:
   (A) a database journal that includes a journal entry for a selected record in a database, wherein the journal entry includes:
      (A1) an indication of a change to at least one portion of the selected record; and
      (A2) a validation value that represents a state of the selected record in the database before making the change to the selected record.

27. The program product of claim 26 wherein the computer-readable signal bearing media comprises recordable media.

28. The program product of claim 26 wherein the computer-readable signal bearing media comprises transmission media.

29. The program product of claim 26 further comprising a database journaling mechanism on the computer-readable signal bearing media for generating the database journal.

30. The program product of claim 26 wherein the indication of change lists less than all the selected record.

31. The program product of claim 26 wherein the validation value comprises a checksum.

32. The program product of claim 26 wherein the validation value is computed from data in the selected record.

33. The program product of claim 32 wherein the validation value is further computed from metadata for the selected record.

34. The program product of claim 26 wherein the validation value is unique for data values stored in the selected record.

35. A program product on a tangible computer-readable storage, media comprising:
   (A) a database journal that includes a journal entry for a selected record in a database, wherein the journal entry includes:
      (A1) an indication of a change to at least one portion of the selected record; and
      (A2) a checksum that represents a state of the selected record in the database before making the change to the at least one portion, the checksum being computed from data in the selected record before making the change and from metadata for the selected record.

36. The program product of claim 35 wherein the computer-readable signal bearing media comprises recordable media.

37. The program product of claim 35 wherein the computer-readable signal bearing media comprises transmission media.

* * * * *